Oct. 9, 1923.

R. W. FUNK 1,469,784

TROLLEY WHEEL

Filed Aug. 10, 1921    2 Sheets-Sheet 1

Witnesses.
Albert R Bronner
John N. Curntz

Inventor
RICHARD W. FUNK
By his Attorney

Oct. 9, 1923.                               1,469,784
R. W. FUNK
TROLLEY WHEEL
Filed Aug. 10, 1921        2 Sheets-Sheet 2
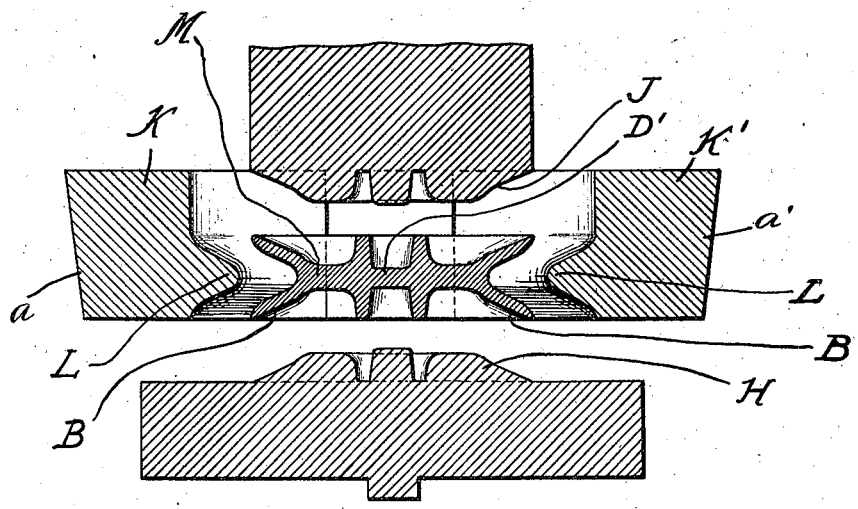
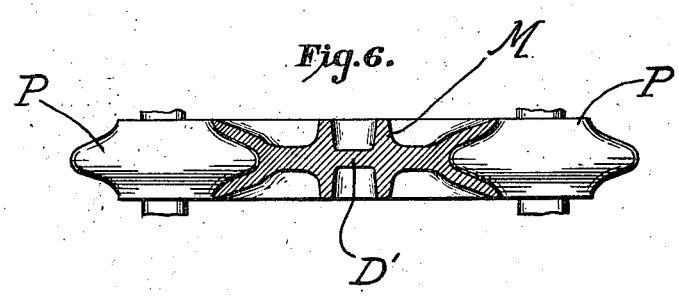
Inventor
RICHARD W. FUNK
By his Attorney
Witnesses:

Patented Oct. 9, 1923.

1,469,784

UNITED STATES PATENT OFFICE.

RICHARD W. FUNK, OF BELLEFONTE, PENNSYLVANIA.

TROLLEY WHEEL.

Application filed August 10, 1921. Serial No. 491,091.

*To all whom it may concern:*

Be it known that I, RICHARD W. FUNK, a citizen of the United States, residing in the city of Bellefonte, county of Center, State of Pennsylvania, have invented certain new and useful Improvements in Trolley Wheels, of which the following is a specification, reference being had to the accompanying drawings, illustrative of one particular embodiment of my invention.

This invention relates to trolley wheels, that is to say the wheel at the end of a trolley pole which rides on the trolley wire or rides on a conductor, and while moving freely establishes electrical contact. In particular, this trolley wheel is of material and structure constituting a great improvement over trolley wheels heretofore made and in use. Among the objects of my invention are to produce a wheel of greater durability, greater economy in production, of better electrical characteristics, more uniform wearing and with other features of advantage as may be seen from the following specification, or which will be realized in the practice of my invention.

In the production of trolley wheels and similar articles, heretofore usually brass or a metal alloy has been cast, and the casting has been machined and various details of construction fashioned on one or the other part of the wheel, which in particular has involved an amount of metal in casting considerably beyond the actual amount of metal in the finished wheel. The percentage of defective castings has in regular practice involved the usual losses, some developing in use, and some developing in process of manufacture occasioning consequent loss. The limitations as to the quality of the alloy suitable for such methods of manufacture have furthermore necessitated the use of material deficient in conductivity, besides providing material less advantageous or not equally advantageous for the different parts such as the hub, the runway wear or the flange strength.

By the development of method and process whereby practically pure copper can be used if desired, and by a pressing method only the exact quantity of metal is initially provided which is required for the finished article, and whereby the trolley runway can be given its desired hardness for durability, still leaving the required strength or wearing qualities in other parts,—it has been possible to produce a trolley wheel as an article of manufacture of great superiority in many respects.

An embodiment of my invention is shown in the accompanying drawings, in which:

Fig. 4 is an elevation of a blank containing the exact cubic contents of material for a wheel, before pressing operation.

Fig. 5 is a section on the axis of the pressed blank with the forming dies retrieved.

Fig. 6 is a section of a finished pressed blank with rolls shown in hardening operation.

The trolley wheel A has the two flanges B—B, the web C, the hub D and the runway E.

Figure 1:
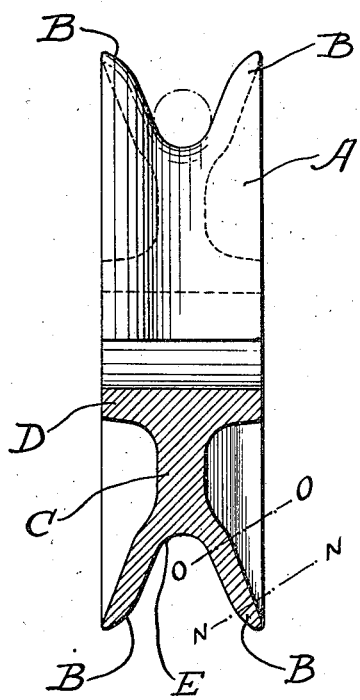
Fig. 1 is a view in half section on the axis of the trolley wheel.
Figure 2:
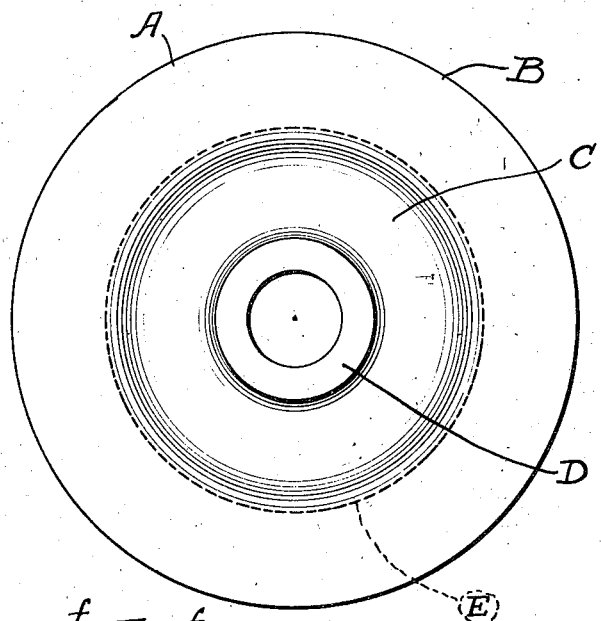
Fig. 2 is a side elevation of a trolley wheel.
Figure 3:
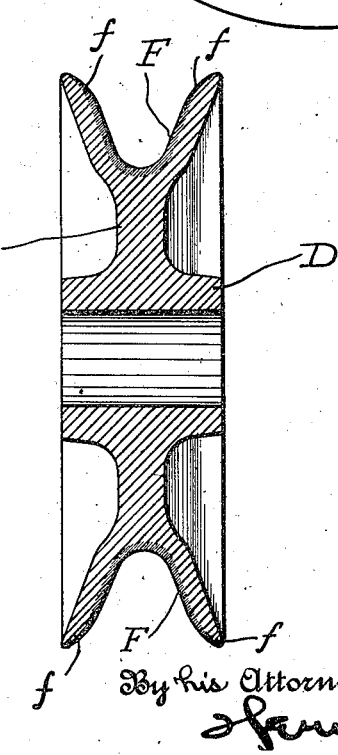
Fig. 3 is a transverse section on the axis.

In the runway, as shown in Fig. 3, the section shows that the metal on the surface of the runway is more dense at F tapering off to points $f$—$f$, while the greatest density is in the crotch of the runway where the surface metal is hardened by condensing and where it is so made in order to resist greatest wear.

The trolley wheel so produced is made from a cylindrical blank G of, for example, substantially pure copper, although other metal or alloys susceptible of the treatment and process may be used.

This blank is heated to about 900 degrees F. when, as preferred, substantially pure copper is used and it is introduced between bottom die H and top die J and the two sides K—K' of the split die. The split dies have the outer conically tapered faces $a$—$a'$, slide into a tapered hole in the barrel which they fit, which brings the two split parts together so that a complete cylindrical projection L exists, conforming to the desired configuration of the runway in the finished article during the pressing operation. The dies are brought up to a suitable heat so as to prevent too great a reduction in the temperature of the blank during the operation. A very great pressure then is applied to the top die and this pressure is so great that the blank G is forced into the form of the finished blank M, as shown in Fig. 5, with the metal flowing into the flanges B—B, and the face of the top and bottom dies forming the web C and forming the hub D, with the hole in the hub pressed in from each side with a suitable draft to prevent the die from sticking and permit its easy release, but leaving in this finished blank M a little web D' of metal, sufficient to provide for the proper flow of metal in the pressing process. This web D' is later cut out when the hole in the hub is machined cylindrically to the size desired for the trolley shaft for which the wheel is intended.

The flange B should have its section at N—N substantially equal to or a little larger than the section of the flange at O—O, in order to assure the flow of metal which results by the extruding of the metal from the blank into the finished article when subjected to the great pressure that causes the spread of the metal radially to the extreme corners or edges of the flanges.

After the production of the blank M it is chucked so that the wheels P—P, with suitably formed peripheries, will engage the runway and while rotating the blank M the plurality of wheels P—P, preferably 3, are pressed radially inward and by their running contact with the runway they condense the surface metal of the runway, while the outer sides of the flanges are backed up in the chuck by a die moving with the flanges, so that the runway surface is hardened to the degree desired in this part of the trolley wheel. This characteristic of the finished article is provided without any treatment of the finished blank which would affect other parts than the runway, and which gives the hardened surface to the runway without injuring the strength of the flanges against lateral strain or without affecting the strength or characteristics of the metal in other parts of the wheel, which otherwise would result from other heat-treating methods.

The resulting article produced by the method above described means the production of a trolley wheel from a blank having the cubic contents of metal practically exactly equal to the cubic contents of the finished wheel. It produces a finished article in one operation, therefore with great economy, but the finished article in all parts is structurally correct to meet the requirements of strength and durability. The article has its metal texture uniform without the chance of blow-holes which are involved in casting.

While the process and method involve care and exact knowledge of the treatment of metals, particularly copper, or any alloys feasible for the purpose, the resulting article is superior in all respects to trolley wheels as heretofore produced, both as to structure and finish as well as the economies and other advantages in production.

It may be noted that the hardening F of the runway, when on a substantially pure copper trolley, is less subject to heating, because of the greater conductivity of the article herein described as compared with trolley wheels heretofore used. The avoidance of undue heating assures the maintenance of the hard surface throughout a longer period of operation, thereby greatly adding to the wear. The hardening by surface condensing of the metal by pressure furthermore resists any annealing effect that would result from some other heat treatments. For these and other reasons this article has its substantial advantages in practical use.

It has not heretofore been feasible to produce trolley wheels with the high copper content, or of substantially pure copper, and articles heretofore in use may be therefore compared as having a conductivity of about 56 compared with the article herein described which may be made with a conductivity of 99.8. Furthermore, a wheel finished weighing two pounds is produced from very little over two pounds' weight of blank, whereas previous wheels when cast require initially about three pounds of metal, of which one pound was eliminated in the process of manufacture, adding the cost of scrap to the cost of machining in addition to the percentage loss due to imperfections in the various steps of production.

While variations in form and design may be made from the specific embodiment of my invention herein shown and described, and the article may be made to serve other purposes than specifically a trolley wheel, which latter offers the most advantageous use of my invention,—what I claim and desire to secure by Letters Patent is:

1. A copper, pressed one-piece trolley wheel.

2. A solid copper trolley wheel, pressed in one operation.

3. A pressed one-piece solid metal trolley wheel having the metal cold rolled to a condensed surface texture in the runway.

In testimony whereof, I have signed my name to this application, in the presence of two subscribing witnesses, this 29th day of April, 1921.

RICHARD W. FUNK.

Witnesses:
HERMANN F. CUNTZ,
H. MUCHMORE.